UNITED STATES PATENT OFFICE.

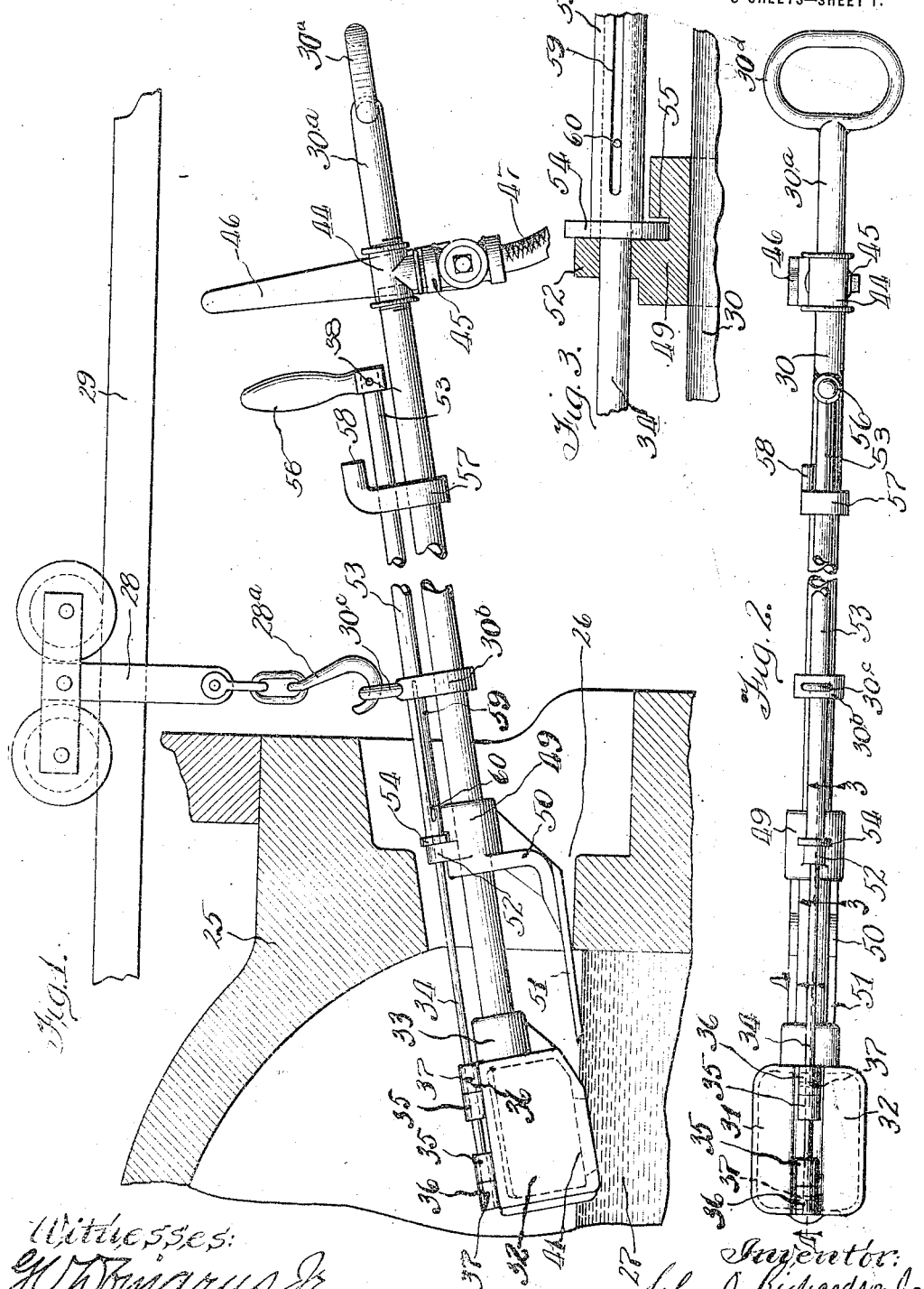

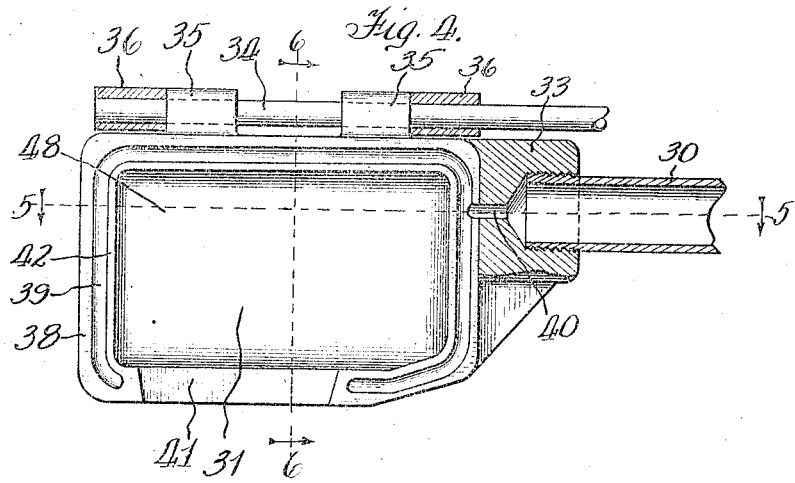
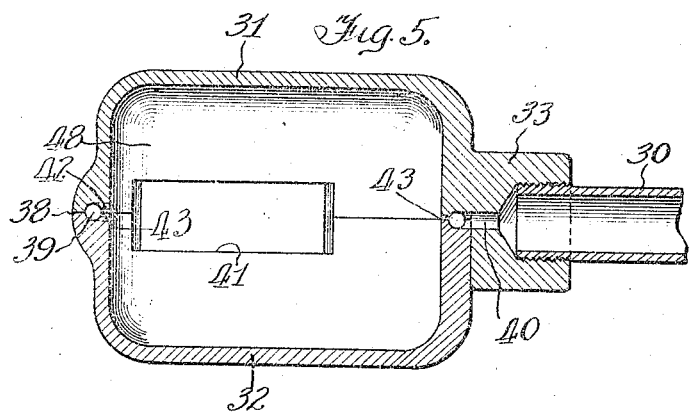
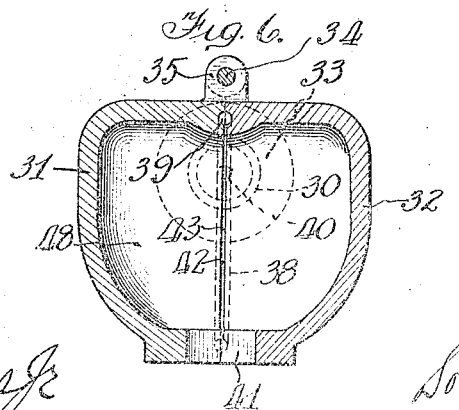

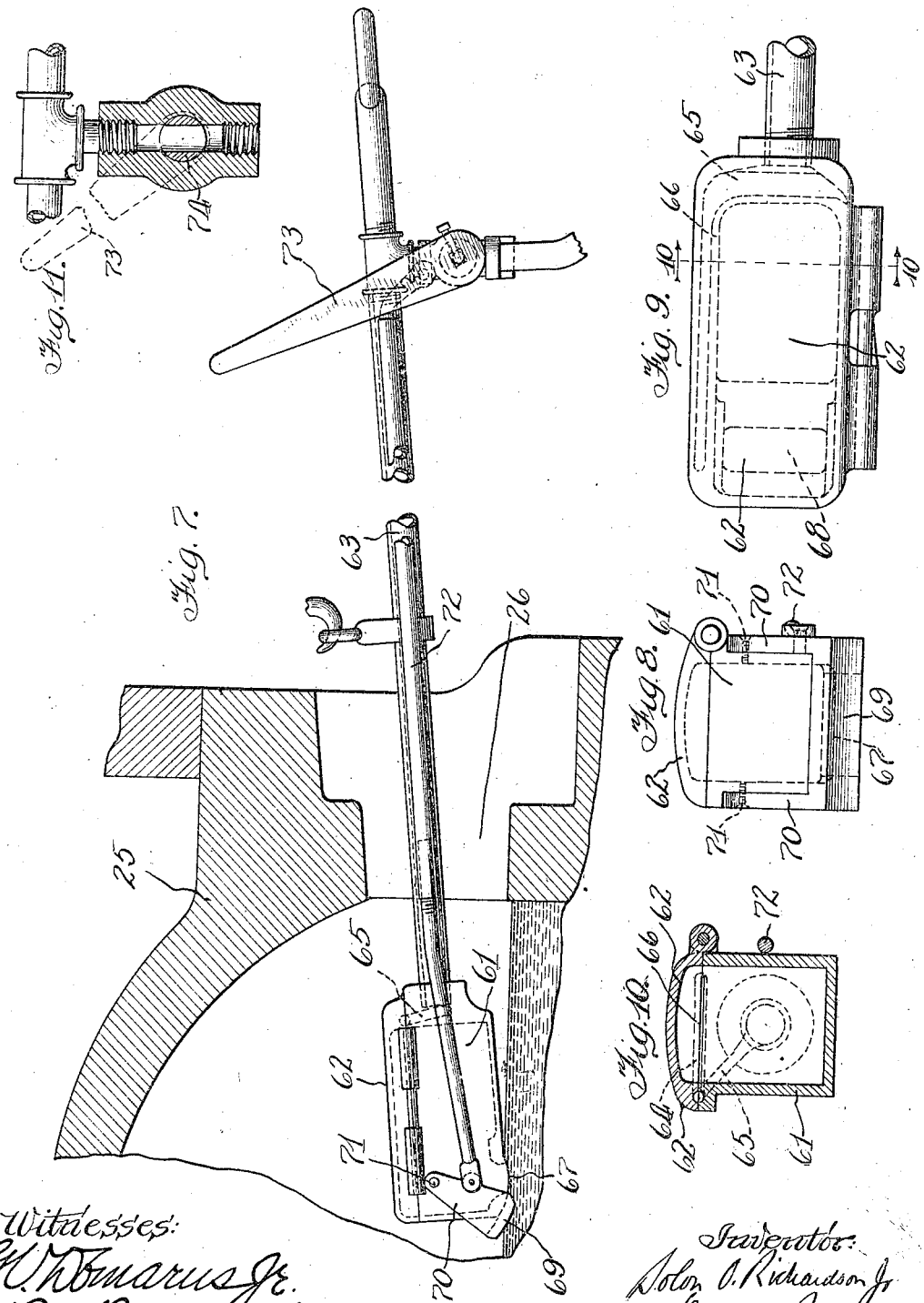

SOLON O. RICHARDSON, JR., OF TOLEDO, OHIO.

VACUUM-OPERATED GLASS-LADLE.

1,147,438.   Specification of Letters Patent.   Patented July 20, 1915.

Application filed September 11, 1912. Serial No. 719,860.

*To all whom it may concern:*

Be it known that I, SOLON O. RICHARDSON, Jr., a citizen of the United States, residing at Toledo, in the county of Lucas and State of Ohio, have invented certain new and useful Improvements in Vacuum - Operated Glass-Ladles, of which the following is a specification.

My invention relates to implements for handling molten glass or like substances.

The object of the invention is to provide a glass handling implement, to take the place of the ordinary ladle, which is filled by suction.

When molten glass is ladled from the furnace by dipping the ladle into the body of glass in the glass pot or tank, which is the method heretofore pursued, a certain amount of air is carried into the glass which is likely to remain there in the form of bubbles and injure its quality. Moreover, the submerging of a relatively cold ladle in the body of glass in the furnace necessarily tends to cool the same. Furthermore, the fact that the ladle is open, exposing its contents to the air, results frequently in cooling the glass in the ladle more than is desirable. My invention provides an implement for handling glass which obviates all these objections. The filling is produced by suction and hence the receptacle, instead of being submerged in the glass in the furnace at each operation, is merely brought into contact with the surface of the glass. The receptacle is closed on all sides instead of being open to the atmosphere as the ordinary ladle is, and this tends to keep the glass hot while it is being transported.

The invention is illustrated, in certain preferred embodiments, in the accompanying drawings, wherein—

Figure 1 is a side elevation of one form of device, a portion of a glass furnace of ordinary construction being shown in section; Fig. 2, a plan view of the device; Fig. 3, a detail, sectional elevation, on an enlarged scale, taken on line 3—3 of Fig. 2, looking in the direction of the arrows; Fig. 4, a similar view taken on line 4—4 of Fig. 2; Fig. 5, a sectional plan on line 5—5 of Fig. 4; Fig. 6, a cross-sectional view on line 6—6 of Fig. 4; Fig. 7, a view similar to Fig. 1 illustrating a modified construction; Fig. 8, an end view of the device shown in Fig. 7; Fig. 9, a plan view of a part of the same; Fig. 10, a sectional view on line 10—10 of Fig. 9 looking in the direction of the arrows and Fig. 11, a detail section illustrating the construction of the air control valve.

Like characters of reference designate like parts in the several figures of the drawings.

In the drawings, 25 designates a glass furnace of ordinary construction provided with the usual working opening 26.

27 designates a body of molten glass in the furnace.

28 designates a trolley for assisting in the manipulation of the ladle, the trolley running on an overhead rail 29.

The form of device shown in Figs. 1 to 6, inclusive, is constructed as follows: 30 designates a hollow handle furnished at one end with the hand grip 30ᵈ and at the other end with a receptacle for the glass. This receptacle consists of two elements 31, 32, the element 31 being formed with a projection 33 having a threaded opening for the end of the handle 30. The element 32 of the receptacle is hinged to the element 31, 34 designating the pintle of the hinge which extends through bosses 35 on element 31 and bosses 36 on the element 32. The pintle is secured to the bosses 36 by pins 37 and is extended beyond the hinge parallel with handle 30.

The meeting faces 38 of the elements 31, 32 are formed with channels 39 which communicate with the interior of the handle 30 by means of a port 40 formed in the projection 33. The elements are so formed as to provide an intake opening 41 on the bottom of the receptacle. The portions 42 of the meeting faces 38 which are within the channels 32 are formed so that they stand a very slight distance apart providing a very narrow suction port 43 extending around the receptacle and communicating with the interior of the handle 30. The width of the port or slit 43 is considerably exaggerated in the drawings, as it would be impossible to show its real width.

The handle is preferably made in two sections, the outer section being designated 30ᵃ. Between the sections is interposed a T-fitting 44 to which is secured a globe valve 45 having the operating lever 46. A flexible tube 47 leading to an exhausting apparatus (not shown) is connected with the casing of the globe valve.

The glass is sucked up into the chamber 48 within the receptacle through the intake port 41 by the opening of valve 45 which puts the device in communication with the exhausting apparatus. This takes place, of course, when the elements or leaves 31, 32 are in closed position. The weight of the leaf or element 32 tends to keep it close against the other leaf. The implement may then be withdrawn from the furnace and the contents of the glass receptacle dumped by opening out the leaves 31, 32 on their hinge. Before the ladle leaves the furnace, a cut-off mechanism is operated to cut off any glass that may project out of the intake port. The cut-off mechanism and the means for opening up the receptacle consist of the following parts: Slidable on the handle 30 is a collar 49 on the under side of which is formed a bracket 50 to which is secured the cut-off blade 51, so placed as to slide under and across the intake port 41 with the movement of the collar 49 on the handle 30. The pintle 34 of the receptacle hinge projects through a boss 52 formed on the upper side of the collar 49 and into the bore of a hollow rod 53 provided at one end with a circular enlargement 54 which extends into a slot 55 in the collar 49. The rod 53 is provided at the other end with a handle 56, the rod extending through and having a bearing in a collar 57 rigidly secured to the handle 30 and formed with a lug 58 having a curved face adapted to be engaged by the handle 56. The rod 53 is also formed with a guide slot 59 to receive a pin 60 on the end of the hinge pintle 34.

With the parts of the device in the positions shown in the drawings, the cut-off blade is moved across the intake opening 41 by moving the handle 56 toward the receptacle. The blade 51 lies flatwise against the bottom of the receptacle, completely closing the opening 41. The handle 56 engages the lug 58 and prevents the hinge of the receptacle from opening. The charge of glass in the receptacle is discharged by first pulling back on handle 56 so as to withdraw the cut-off blade 51 from its engagement with the bottom of the receptacle and then turning the handle 56 to the right which, because of the pin and slot engagement between the hollow rod 53 and the pintle 34 of the hinge, causes the leaf or element 32 to swing away from the fixed element 31.

The handle 30 is preferably provided with a collar 30$^b$ having a ring 30$^c$ for the hook 28$^a$ of the trolley 28.

In the other form of the invention shown in Figs. 7 to 11, inclusive, the construction is somewhat different. The receptacle consists of a box 61 having a hinged cover 62, the box being fixed to the end of the hollow handle 63 and formed with the ports 64 communicating with the interior of the handle by a port 65 and with the interior of the receptacle by the narrowed ports or slits 66. The outer portion of the bottom of the box is formed on a curve as indicated at 67 and the intake opening, designated 68, is formed in the curved part. The cut-off knife 69 is similarly curved and formed with arms 70 pivoted to the sides of the box by the bolts or screws 71. The cut-off element is swung back and forth by means of a rod 72 pivoted to the lever 73 of the valve 74 which controls the exhaust. With this arrangement the vacuum is shut off simultaneously with the passing of the cut-off blade across the intake opening, the cut-off blade serving to close the opening as well as to cut off surplus metal, if any there be. In this form of ladle the receptacle is opened by gravity when the glass is to be discharged. The ladle is simply turned upside down and cover 62 swings out on its hinge.

It will be seen that in neither form of construction does the ladle have to dip into the glass in the furnace to any considerable extent, hence the removal of the glass from the furnace does not involve the danger of introducing air into the body of metal in the furnace. The charge of glass in the receptacle is not exposed at any point to the atmosphere and therefore can be kept hot much better than in an open ladle.

While I have described my invention in certain preferred constructions, it will be readily understood that modifications might be made within the scope of the claims without departing from the principle of the invention. Hence, I do not wish to be understood as limiting the invention to the precise constructions shown and described.

I claim:

1. In a glass handling implement, the combination with a hollow handle, of a receptacle at one end of said handle having an intake port in the bottom comprising two elements one movable with respect to the other, which are formed so as to provide an exhaust duct communicating with the interior of the handle, means for opening and closing the communication between the interior of said handle and an exhausting apparatus, a cut-off device, and a second handle mounted upon the first mentioned handle so as to be revolubly and slidably operated, the operation of which in one manner operates said cut-off device, and its operation in the other manner opens said receptacle to discharge the glass.

2. In a glass handling implement, the combination with a hollow handle, of a receptacle at one end of said handle having an intake port in the bottom comprising two elements having a hinged relation with respect to each other, which are formed so as to provide an exhaust duct communicating with the interior of the handle, means for opening and closing the communication between the interior of said handle and an exhausting apparatus, a cut-off device movable across said intake port, and a second handle mounted upon the first mentioned handle so as to be revolubly and slidably operated, the operation of which, in one manner, operates said cut-off device, and when operated in the other, causes the elements of said receptacle to be swung apart on their hinge.

3. In a glass handling implement, the combination with a hollow handle provided with means for putting the interior of the same in communication with an exhausting apparatus, of a receptacle provided with an intake opening in the bottom and consisting of two elements one rigidly connected with said hollow handle and the other connected with the first-named element by a hinge having a pintle extending outwardly parallel to said handle, said receptacle being formed with ports leading from the interior of the handle to the interior of said receptacle, a sleeve slidable upon said handle, a cut-off knife on said sleeve, a hollow rod having a collar engaging said sleeve into the bore of which extends the end of the hinge pintle, the hollow rod being provided with a guide slot and the pintle with a pin operating therein, a hand grip on the hollow rod, and a stop on the handle with which said hand grip is adapted to engage.

4. In a glass handling implement, the combination with a hollow handle adapted to be connected with an exhausting apparatus, of a receptacle provided with an intake opening in the bottom and comprising an element fixed to said hollow handle and an element pivoted to said fixed element, said elements being formed so as to provide an exhaust duct between their meeting faces which communicates with the interior of said hollow handle, and means for moving said last element on its pivotal connection for the purpose of discharging the gather.

5. The combination of a pipe, a ported receptacle communicating with one end thereof and including two complementary members hinged together, a cut-off movable across the port, a handle revolubly and slidably mounted upon the pipe, and connections whereby a shift of the handle longitudinally of the pipe will operate the cut-off and oscillation of the handle in a plane at right angles to the direction of shift will cause relative movement of said members on their hinge.

6. The combination of a pipe, a ported receptacle carried thereby and including two complementary members, a pintle parallel with the pipe, fixed to one of said members and hinging it to the other, a collar slidably mounted on the pipe, a cut-off carried by the collar and movable thereby to traverse the port, and a handled rod paralleling the pipe, telescoping one end of the pintle, having a pin and slot connection therewith, and joined to the collar to slide the same and oscillate with respect thereto.

7. A glass handling implement comprising a hollow handle adapted to be connected with an exhaust apparatus, a receptacle upon the hollow handle comprising two elements hinged together, a shaft mounted longitudinally on said hollow handle and so connected with one of said receptacle elements that said element may be swung on the hinged connection between said receptacle elements by the rotation of said shaft, said device being constructed so as to provide an exhaust duct between the interior of said receptacle and the interior of said hollow handle, and so as to provide an intake opening in the bottom of said receptacle.

SOLON O. RICHARDSON, Jr.

Witnesses:
H. A. PEITER,
W. F. DONOVAN.